Patented July 31, 1945

2,380,402

UNITED STATES PATENT OFFICE 2,380,402

POLYMERIZATION OF BUTADIENE-1,3 HYDROCARBONS

George L. Browning, Jr., Akron, Ohio, assignor, by mesne assignments, to The B. F. Goodrich Company, Akron, Ohio, a corporation of New York No Drawing. Application October 22, 1941, Serial No. 416,083

8 Claims. (Cl. 260—84.5)

This invention relates to the polymerization of butadiene-1,3 hydrocarbons, and particularly to a method whereby butadiene-1,3 hydrocarbons may be polymerized in the form of aqueous emulsions to form products closely resembling natural crude rubber.

The emulsion polymerization of butadiene-1,3 hydrocarbons either alone or in admixture with other monomers copolymerizable therewith to form compositions of matter more or less resembling rubber is well known. It has been commonly observed, however, that the products of such polymerization reactions often resemble vulcanized rubber rather than natural crude rubber in respect to solubility, plasticity, and processing characteristics. Thus it has often been found that the polymers were insoluble in, and, in some cases, not even swelled by benzene or acetone, and that they were tough, non-plastic materials which either would not homogenize on a mill or which were very difficult to mill and to subject to other ordinary processing operations.

I have now discovered a class of materials which modifies the emulsion polymerization of butadiene-1,3 hydrocarbons in such a manner that polymers more nearly resembling natural crude rubber may be produced than when the polymerization is effected in the absence of the materials of this invention. The class of materials, which I have termed "modifiers," consists of compounds containing the group

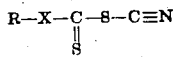

wherein R is an organic radical derived by removing the hydroxyl group from a monohydric alcohol and X represents oxygen or sulfur. These compounds may be prepared by reacting an alkali metal xanthate or thioxanthate with a cyanogen halide with the elimination of salt. Sodium isopropyl xanthate, for instance, may be reacted with cyanogen chloride with the elimination of sodium chloride to form isopropoxythiono cyano monosulfide according to the following equation:

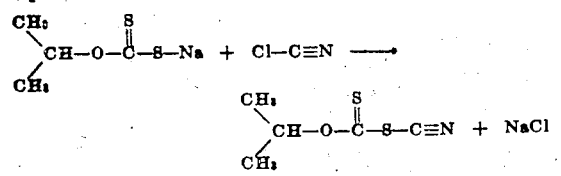

The reaction may conveniently be effected by bubbling cyanogen chloride through an aqueous solution of a xanthate. The reaction product settles to the bottom as an oil. If desired, an organic solvent such as acetone may be used in place of water.

The xanthates employed in this reaction may be prepared by the known reaction with carbon disulfide and an alkali such as sodium hydroxide of an alcohol such as methyl alcohol, ethyl alcohol, isopropy alcohol, ter.-butyl alcohol, act. amyl alcohol, lauryl alcohol, benzyl alcohol, cyclohexyl alcohol, tetrahydrofurfuryl alcohol, allyl alcohol, methoxy-ethyl alcohol, or one of the corresponding thiols.

The effect of the modifiers of this invention on emulsion polymerization is shown by the copolymerization at 30° C. of 55 parts by weight of butadiene-1,3 and 45 parts of acrylonitrile in the presence of about 250 parts of a 2% aqueous solution of myristic acid which had been 85% neutralized with sodium hydroxide, 0.35 part of hydrogen peroxide as an initiator, 0.11 part of sodium ferri pyrophosphate as an activator, and 0.35 part of isopropoxythiono cyano monosulfide. The polymer obtained by coagulating the latex formed was in a plastic and coherent form and was 35% soluble in acetone, while the polymer obtained by polymerization in the absence of any modifier was in the form of non-coherent crumbs which were practically insoluble in acetone. The vulcanizate prepared by testing the modifier in a tire tread recipe was unusually strong and exhibited a high elongation.

The proportion in which the modifier is included in the composition depends somewhat upon the properties desired in the product, the higher proportions of modifier in general producing softer, more soluble polymers. Very small amounts of modifier such as 0.1% or even less based on the monomers in the emulsion may profoundly affect the nature of the polymer produced, and amounts up to 5% or more may advantageously be employed. It may also be advantageous to employ a mixture of one of the modifiers herein claimed with other known types of modifiers such as tetraalkyl thiuram polysulfides, mercaptoalkylthiazoles or other types of compounds known to exhibit modifying activity in emulsion polymerization processes.

The modifying agents of this invention may be employed in the polymerization in the form of an aqueous emulsion of butadiene-1,3 hydrocarbons, by which is meant butadiene-1,3 (commonly termed butadiene) and its homologues which enter into polymerization reactions in essentially the same manner, either alone or in admixture with each other and/or other monomers copolymerizable therewith such as styrene, isobutylene, acrylonitrile, methyl methacrylate, methyl acrylate, methyl vinyl ether, methyl isopropenyl ketone, and other unsaturated hydrocarbons, esters, ethers, and ketones. For the production of rubbery products, these other monomers should be employed in an amount smaller than the butadiene.

The polymerization of the above materials in aqueous emulsion may be effected by various initiators of polymerization such as per-compounds including per-acids, peroxides, and per-salts such as persulfates, perborates, percarbonates, and the like as well as other types of initiators such as diazoaminobenzene, hydrosulfites, bisulfites, and dipotassium diazomethane disulfonate.

The polymerization reactions may be catalyzed in any desired manner, the use of heavy metal catalysts being particularly desirable. The heavy metal catalyst may be added to the emulsion in the form of less than 0.1% based on the weight of the monomers of a simple ionizable heavy metal salt such as cobalt chloride, nickelous sulfate, mercuric chloride, etc., as disclosed in the copending application of William D. Stewart, Serial No. 379,712 filed February 14, 1941 or in the form of a redox system comprising a heavy metal and a material such as sodium pyrophosphate, levulinic acid, glycine, cystine, beta-mercaptoethanol, quebrachitol, ox-bile or chloresterol as disclosed in the copending applications of William D. Stewart, Serial Nos. 379,713 to 379,717 filed February 14, 1941.

Any of the ordinary emulsifying agents such as fatty acid soaps including sodium oleate, potassium stearate, sodium myristate, etc., may be employed, as well as synthetic saponaceous materials such as hymolal sulfates and alkaryl sulfonates including sodium lauryl sulfate and sodium isopropyl naphthalene sulfonate.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing a butadiene-1,3 hydrocarbon in the form of an aqueous emulsion in the presence of a small amount of a compound of the formula

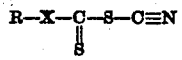

wherein R is an organic radical derived by removing the hydroxyl group from a monohydric alcohol and X is a member of the group consisting of oxygen and sulfur.

2. The method which comprises polymerizing a butadiene-1,3 hydrocarbon in the form of an aqueous emulsion in the presence of an alkoxy thiono cyano monosulfide wherein the alkoxythiono and cyano groups are directly attached to the same sulfur atom.

3. The method which comprises polymerizing a butadiene-1,3 hydrocarbon in the form of an aqueous emulsion in the presence of isopropoxythiono cyano monosulfide.

4. The method which comprises polymerizing in aqueous emulsion a mixture of butadiene-1,3 and a smaller amount of a mono-olefinic monomer copolymerizable therewith in aqueous emulsion, in the presence of a small amount of a compound of the formula

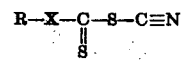

wherein R is an organic radical derived by removing the hydroxyl group from a monohydric alcohol and X is a member of the group consisting of oxygen and sulfur.

5. The method which comprises polymerizing in aqueous emulsion a mixture of butadiene-1,3 and a smaller amount of a mono-olefinic monomer copolymerizable therewith in aqueous emulsion, in the presence of an alkoxythiono cyano monosulfide wherein the alkoxythiono and cyano groups are directly attached to the same sulfur atom.

6. The method which comprises polymerizing in aqueous emulsion a mixture of butadiene-1,3 and a smaller amount of a mono-olefinic monomer copolymerizable therewith in aqueous emulsion, in the presence of isopropoxythiono cyano monosulfide.

7. The method which comprises polymerizing a mixture of butadiene-1,3 and a smaller amount of acrylonitrile in aqueous emulsion in the presence of isopropoxythiono cyano monosulfide.

8. The method which comprises polymerizing a mixture of butadiene-1,3 and a lesser amount of styrene in an aqueous emulsion in the presence of isopropoxythiono cyano monosulfide.

GEORGE L. BROWNING, Jr.